June 13, 1950     G. STRYSKO     2,511,022
AUTOMATIC HEAT CONTROL SYSTEM
Filed March 14, 1946
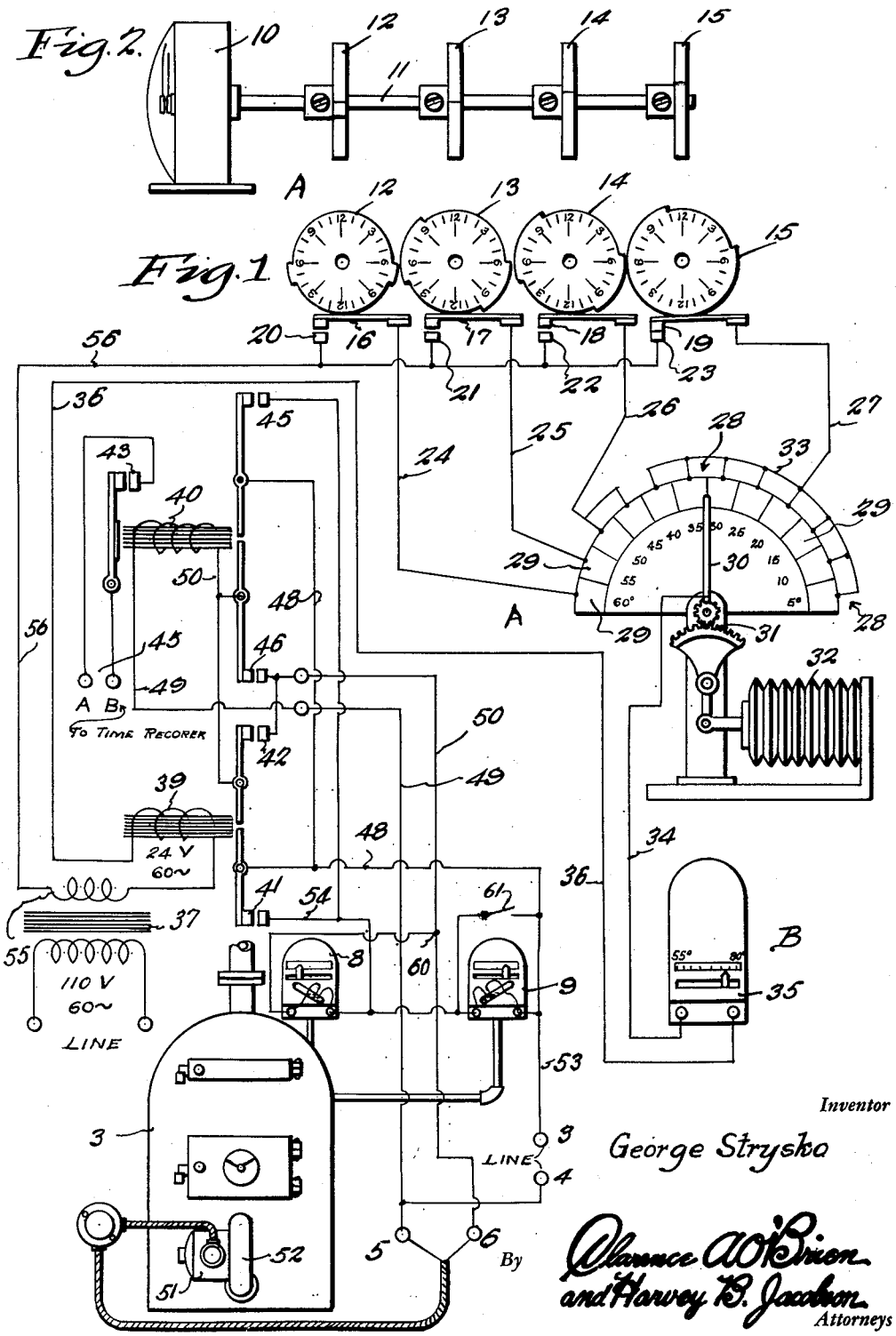
Inventor
George Strysko
By Clarence A. O'Brien
and Harvey B. Jacobson
Attorneys Patented June 13, 1950

2,511,022

UNITED STATES PATENT OFFICE 2,511,022

AUTOMATIC HEAT CONTROL SYSTEM

George Strysko, Flushing, N. Y.

Application March 14, 1946, Serial No. 654,351

4 Claims. (Cl. 236—91)

This invention relates to systems for controlling the operation of heating installations in apartment houses, business and office buildings and other places with a large number of radiators adapted to be operated centrally in accordance with a master control, regulating their output and it has for its object to provide a completely automatic control of the heat supply for instance of the boiler furnishing the steam for the heating system, which is simple and efficient and which will permit to fulfill the complex requirements with a minimum of equipment.

A further object of the invention consists in providing a simple arrangement by means of which all the thermostatic and time control units will be able to influence the source of the heat supply directly and automatically.

Further objects of the invention will be explained in the detailed specification.

The invention is illustrated in the accompanying drawings with reference to one modification only. It is, however, to be understood that the fact that merely one modification of the invention is described and illustrated is not to be regarded as limitative. The invention mainly consists in the system used and this system is described in such terms that further modifications of the system and of its components and details are foreshadowed or suggested to the expert skilled in the art, which, when included in the annexed claims, are to be considered as a part of the invention and not as a departure therefrom.

In the accompanying drawing:

Figure 1 is a diagrammatic view of the entire heating system, showing a boiler, furnishing steam for the radiators of an apartment house or other installation, and those controls which are not connected with the proper functioning of the boiler itself, but introduce a regulation dependent on the outside temperature, the temperature of a standard or control room within the house, the hour of the day and similar variable outside influences.

Figure 2 is a side view of a detail.

The diagrammatic view shown in the drawing illustrates the heating system of a building with many radiators, which may be individually adjustable or not and which may be subjected to several types of regulations.

According to the invention a boiler 3 is provided whose fuel supply and/or pressure is regulated by suitable means and which produces and supplies the steam required for the heating of the radiators of the system.

The boiler is connected with the customary limit control switches 8, 9 for controlling the pressure and the hot water temperature, respectively. These limit control switches contain as a rule, trip switches provided with a mercury contact. The pressure control switch operated by a manometric device, controls the circuit of the motor supplying the fuel. The hot water limit control switch controls the hot water temperature of the boiler. By means of these switches the temperature of the water and the pressure of the steam are automatically held at the required or desirable values.

The regulation of the boiler 3 in accordance with the outside temperature and in accordance with the varying requirements at different hours of the day and night is obtained by means of the arrangement designated in general by the reference letter A. This arrangement consists of a clock 10 (Figure 2) driving a shaft 11, carrying a number of cam discs 12, 13, 14, 15. The shaft and the cam discs will rotate once within 24 hours. The number of cam discs is arbitrary and depends on the number of different heating periods into which the day and night is divided and which will require different treatment in accordance with the outside temperature.

The discs which are mounted on the same shaft are shown in front view one beside the other in the diagram (Figure 1) for the sake of clearness. The disc 15, for example, shows a cam which will differentiate between the hours of the day when heat has to be provided and the hours of the night, say between 11 P. M. and 5 A. M., when either the steam supply is cut off or when this supply is kept to the lowest minimum. The disc 14 is provided with a cam surface active during a shorter period, say during the hours between 6 and 10 A. M. and P. M. when heat supply is required in the event of a higher outside temperature. Discs 13 and 12 are provided with still smaller cam surfaces for heat supply during a few hours only.

Each cam disc 12, 13, 14, 15 operates a movable contact arm 16, 17, 18 and 19, respectively, which in its turn cooperates with a fixed contact 20, 21, 22, and 23, respectively.

The selection of the length of the period during which heat has to be furnished to the radiators manifestly depends on the outside temperature, as it is, for instance, unnecessary to furnish heat during certain hours of the night or day when the outside temperature is high. The circuits controlled by the cam discs 12, 13, 14 and 15 are, therefore, cooperating with a contact bank 28, comprising a number of isolated segments 29. On these segments a contactor arm 30 is sliding which is driven by means of a gear 31, illustrated diagrammatically, from a thermostat 32 shown as a bellows which is influenced by the outside air. The contact arm 30 will, therefore, be moved to one of the segments 29 in accordance with the outside temperature and all those segments 29 which are to be active at this temperature may be interconnected and connected with the conductors 24, 25, 26 and 27, respectively, leading to the cam operated contacts 20, 21, 22, 23, respectively, which regulate the heat required for the particular period of the day.

For instance, up to a certain temperature say 35° or 40° the cam disc 15 will close the control circuit at contacts 19 and 23 during all day hours. The segments up to this temperature are interconnected at 33 and if the contact arm 30 rests on one of these segments the circuit containing these contacts (19, 23) and conductor 27 will be completed by the branch conductor 34 leading to the contact arm 30. If the temperature is higher, say 50°, the contact arm 30 will rest on a segment corresponding to this position and the circuit through contacts 19, 23 is cut out. However, the circuit of cam disc 14 is now connected, which is closed only during a much shorter period in the morning and evening hours in accordance with the higher atmospheric temperature. Still higher atmospheric temperatures require shorter and shorter periods of boiler activity as will be seen from the cam surfaces of discs 12 and 13 connected with the segments 29 reached only at higher outside temperatures.

In addition to the selection as above explained, a thermostatic control may be provided to maintain a predetermined temperature. This is performed by the apparatus, generally referred to by the letter B which consists of a regulation thermostat 35 arranged in a regulation room temperature of which may be considered to be at the desirable or regulation value, which room is preferably located at a central spot. In an apartment house or hotel this room may be the lobby, hall or vestibule or any other similar room. The regulation thermostat has, of course, to be mounted at a place which is not subject to draft or to sudden temperature changes. This thermostat is adjusted to the temperature which should be upheld in the system. The thermostat contacts are connected with the branch conductor 34 leading to the contactor arm 30 of apparatus A and with the conductor 36 which leads to the line transformer 37 from which the control system is supplied with current.

The control system comprises the two relays 39 and 40, each of which is provided with a number of relay contacts. In the example shown starting relay 39 is provided with two pairs of contacts 41, 42 of which contact 41 controls a circuit 48 shunting the limit switch 9 while contact 42 closes the circuit of boiler control relay 40 which is provided with two contact pairs 45, 46. The latter contact is merely a holding contact keeping its own winding energized. The former keeps the circuit 48 closed, upon energization of the relay 40. A normally open manual switch 61 may be provided in a branch which is parallel to the limit control 9 which permits to short circuit said control.

The energizing circuit 49, 50 of the relay 40, as seen, includes the motor 51 of the oil burner or stoker which supplies the fuel and which is connected with said circuit at the terminals 5, 6.

It is to be understood that the boiler and relay arrangement may be provided with all the other equipment which is usually or in certain cases part of such an installation. Thus, for instance, in the case of an intermittent oil burner the well known apparatus for the control of intermittent ignition is inserted, to secure regular function of the intermittent burner. The motor 51 of the boiler fuel supply is sometimes operated by a magnetic switch, which has to be connected to the circuit 5, 6 instead of the motor circuit, while the latter is a separate circuit operated by the magnetic switch. These and other modifications are obvious to those skilled in this art and are mere adaptations of the system to given or prescribed conditions.

The operation of the arrangement is the following.

Assuming first that the water in the boiler has reached a certain low temperature then the limit control switch 9 will be tripped and will operate the boiler motor, in order to heat the water. The latter operation is performed, by closing a circuit starting at the line terminals 3, 4 and running from 3 over line 53 closed switch 9 and over closed pressure control switch 8 to terminal 6 and from here to motor 51, terminal 5 and line terminal 4.

This operation as seen does not affect the heat control in any way. It is, therefore, performed in the same way in which it is performed in known installations. When the water in the boiler has been heated, the circuit is broken by limit control switch 9 and the boiler motor ceases to operate.

Assuming now that the heat control operates and calls for a heating of the system and further assuming that the outside temperature 32 is 30°, then the thermostat will move the contactor arm 30 to a contact segment 29 corresponding to this temperature. This segment is connected with conductor 27 and the cam contact arm 19. When the cam 15 therefore closes contacts 19 and 23 a circuit will be closed which runs from one end of the secondary of the line transformer 37, over conductor 56 to contacts 23, contact arm 19, conductor 27, segment 29, arm 30, line 34, closed thermostat 35, line 36, relay winding 39 to the other end of the secondary winding of transformer 37. It will be noted that when the system is heated insufficiently, the regulation thermostat 35 is closed, and that the relay will therefore operate. This relay cuts out the limit control switch 9 by providing a shunt around it as the circuit 48 is closed at contacts 41 of relay 39.

The relay contacts 42 close the energizing circuit of relay 40, and operate the motor 51 supplying fuel. The circuit for relay 40 starts at line terminal 3 and runs over conductor 53, circuit 48, now closed at contacts 41, conductor 54, closed pressure control switch 8, to point 60, conductor 50, closed contacts 42, relay winding 40 and to line terminal 4.

Simultaneously, the energizing circuit of the motor 51 is closed, the circuit branching off from point 60 and running over terminals 6 and 5 back to line terminal 4.

It will be noted that when relay 40 operates it closes contacts 45 and 46 which are arranged in parallel to contacts 41 and 42 in the circuits 48 and 49, 50.

The boiler now operates and supplies the system with heat until the regulation thermostat 35 opens up because the regulation room in which it is located has reached the normal temperature. This does not mean however, that the entire system has reached this temperature. The regulation thermostat therefore, cuts out relay 39 by opening its energizing circuit (as above described) but the boiler does not cease to operate as relay 40 is still energized until the boiler reaches the steam pressure to which it has been set. When this limit has been reached, it is certain that the entire system is at least at the temperature of the standard room.

The pressure switch then cuts off the connection through conductor 54 and relay 40 falls back and the motor 51 is cut out.

It will thus be seen that the system is under the control of a plurality of controlling elements which influence the heating medium supplied, but once operated, is not cut out until the prescribed pressure has been reached. The pressure control switch is of course, merely an example. If the system operates with hot water the temperature of the water may be the controlling influence. The main point is that the system operates until a pre-set condition of heating is reached in the system, even after the controls initiating the heating or set to control excessive heating have fallen back. This is necessary in a complex heating system because there is no point in the system which, when regulated, will be able to indicate that, in fact, all points of the system have reached the desired conditions. These conditions have therefore, to be set at a central point or at the source of heat supply.

It will thus be seen that a simple and effective completely automatic control of the heating system can take place as the boiler is under control of the combined influence of the pressure control switch, of the thermostat in the regulation room, of the thermostat and switch influenced by the outside temperature and of the timing arrangement which sets the periods of heating in accordance with the hours of the day.

It will be manifest that many changes of the details of the system are possible without departing from the essence of the invention.

I claim:

1. An electric control system for heating systems, provided with a boiler having electrically driven boiler heat control means, controlled by a minimum limit control switch, responsive to the temperature of the water and operating said heat control means when said temperature drops below a predetermined limit and by a maximum limit control switch, responsive to a predetermined boiler pressure and cutting off said heat control means when the pressure exceeds a predetermined value, said electric control system comprising a boiler control relay system for controlling the operation of the electrically driven heat control means, independently of the minimum limit control switch and in conjunction with the maximum limit control switch, an energizing and a holding circuit for the relay system, the latter controlled by said maximum limit control switch, responsive to the boiler pressure, a regulation thermostat responsive to a predetermined temperature in a regulation room, having contacts arranged within the energizing circuit of the relay system, a plurality of clock operated means, each limiting the time during which the energizing circuit is kept closed in readiness for operation to a predetermined period of a day, and a thermostatically operated selector mechanism, responsive to the prevailing outside air temperature for selecting one of said clock operated means, said relay system being thus energized over the clock operated means, selected by the temperature responsive selector mechanism, and over the contacts of the regulation thermostat, and de-energized by the maximum limit control boiler pressure responsive switch.

2. An electric control system for heating systems provided with a boiler having an electrically driven boiler heat control means, controlled by a minimum limit control switch, responsive to the temperature of the water and operating said heat control means when said temperature drops below a predetermined limit and by a maximum limit control switch, responsive to a predetermined boiler pressure, and cutting off said heat control means when the pressure exceeds a predetermined value, said electric control system comprising an energizing circuit for said heat control means, a boiler control relay system for controlling the operation of the electrically driven heat control means, independently of the minimum limit control switch and in conjunction with the maximum limit control switch, an energizing and a holding circuit for the relay system, the latter controlled by said maximum limit switch, responsive to the boiler pressure, a regulation thermostat responsive to a predetermined temperature in a regulation room, having contacts arranged within the energizing circuit of the relay system, a plurality of clock operated means, each limiting the time during which the energizing circuit is kept closed in readiness for operation to a predetermined period of a day, and a thermostatically operated selector mechanism, responsive to the prevailing outside air temperature for selecting one of said clock operating means, means for supplying said circuits with current, said relay system being energized from said current supply means over the clock operated means and over the contacts of the regulation thermostat, and means operated by said relay system for shifting the energizing conection from the above named energizing circuit to the holding circuit controlled by the maximum limit pressure responsive switch, said relay system and boiler heat control means being thus energized over the clock operated means and regulation thermostat and de-energized by the maximum limit control pressure responsive switch.

3. An electric control system for heating systems provided with a boiler having electrically driven boiler heat control means, controlled by a minimum limit control switch, responsive to the temperature of the water and operating said heat control means, when said temperature drops below a predetermined limit and by a maximum limit control switch, responsive to a predetermined boiler pressure and cutting off said heat control means when the pressure exceeds a predetermined value, said electric control system comprising an energizing circuit for said heat control means, a boiler control relay system, including interdependent relays, one of said relays being a starting relay initiating the operation of the heat control means and controlling the energizing circuit of the same, a second relay being a holding relay, holding the above mentioned energizing circuit of the heat control means closed, an energizing circuit for said starting relay and an energizing circuit for said holding relay, the latter circuit being closed by said starting relay and being controlled by the said maximum limit control switch, responsive to the boiler pressure, a regulation thermostat, responsive to a predetermined temperature in a regulation room, having contacts arranged within the energizing circuit of the starting relay, a plurality of clock operated means controlling the latter circuit, each limiting the time during which the energizing circuit of the starting relay is kept closed and in readiness for operation to a predetermined period of a day, and a thermostatically operated selector mechanism, responsive to the prevailing outside air temperature for selecting one of said clock operated means, said relay system being energized over the clock operated means, selected by the temperature responsive selector mechanism, and over the contacts of the regulation thermostat, while being de-energized by the maximum limit control switch responsive to the boiler pressure.

4. An electric control system for heating systems, provided with a boiler having electrically driven boiler heat control means, controlled by a minimum limit control switch, responsive to the temperature of the water and operating said heat control means when said temperature drops below a predetermined limit and by a maximum limit control switch, responsive to a predetermined boiler pressure and cutting off said heat control means when the pressure exceeds a predetermined value, said electric control system comprising an energizing circuit for said heat control means, a boiler control relay system, including a starting relay, an energizing circuit for the same, contact means operated by said starting relay for cotrolling the energizing circuit of said heat control means, a holding relay, an energizing circuit for the same, the said energizing circuit being controlled by contact means operated by said starting relay and by the maximum limit control switch, said holding relay closing an energizing circuit of the heat control means and its own energizing circuit and holding said circuits closed irrespective of the position of the starting relay, a regulation thermostat, responsive to a predetermined temperature in a regulation room, having contacts arranged in the energizing circuit of the starting relay, a plurality of arcuate cams, a shaft carrying the same, a clock mechanism operating said shaft, contact sets closed by said cams, each of said cams having an arcuate length keeping its contact set closed during a predetermined period of a day, a set of fixed contacts, each of them connected with one of the cam operated contact sets, a contact selector arm, moving over said fixed contacts, a selector thermostat, responsive to the temperature of the outside air, and connected with the selector contact arm, moving the same over the fixed contacts, said selector arm being connected electrically with the regulation thermostat, said cam operated contacts, fixed contacts, selector contact arm, and contacts of the regulation thermostat all controlling the energizing circuit of the starting relay of the boiler control relay system.

GEORGE STRYSKO.

REFERENCES CITED

The following references are of record in the file of this patent:

UNITED STATES PATENTS

| Number | Name | Date |
|---|---|---|
| 1,604,342 | Greenhut | Oct. 26, 1926 |
| 1,694,323 | Jump | Dec. 4, 1928 |
| 1,925,455 | Morgan | Sept. 5, 1933 |
| 2,062,337 | Stewart | Dec. 1, 1936 |
| 2,192,859 | Scoggin | Mar. 5, 1940 |
| 2,275,427 | Greenlee | Mar. 10, 1942 |
| 2,323,411 | Newman | July 6, 1943 |